(12) United States Patent
Bralla et al.

(10) Patent No.: US 9,855,645 B2
(45) Date of Patent: Jan. 2, 2018

(54) FASTENING TOOL WITH MAGNETIC PISTON HOLDER

(71) Applicant: Hilti Aktiengesellschaft, Schaan (LI)

(72) Inventors: Dario Bralla, Buchs (CH); Klaus Raggl, Zürich (CH); Albert Binder, Buchs (CH); Jochen Kuntner, Dornbirn (AT)

(73) Assignee: Hilti Aktiengesellschaft, Schaan (LI)

( * ) Notice: Subject to any disclaimer, the term of this patent is extended or adjusted under 35 U.S.C. 154(b) by 345 days.

(21) Appl. No.: 14/443,693

(22) PCT Filed: Dec. 10, 2013

(86) PCT No.: PCT/EP2013/076040
§ 371 (c)(1),
(2) Date: May 19, 2015

(87) PCT Pub. No.: WO2014/090780
PCT Pub. Date: Jun. 19, 2014

(65) Prior Publication Data
US 2015/0306751 A1 Oct. 29, 2015

(30) Foreign Application Priority Data
Dec. 13, 2012 (DE) .................. 10 2012 223 025

(51) Int. Cl.
*B25C 1/04* (2006.01)
*B25C 1/00* (2006.01)
(Continued)

(52) U.S. Cl.
CPC ............... *B25C 1/00* (2013.01); *B25C 1/047* (2013.01); *B25C 1/08* (2013.01); *H02K 35/04* (2013.01);
(Continued)

(58) Field of Classification Search
CPC .. B25C 1/00; B25C 1/04; B25C 1/047; B25C 1/08; B25C 1/14; B25C 1/18; H02K 5/00;
(Continued)

(56) References Cited

U.S. PATENT DOCUMENTS 3,584,776 A * 6/1971 Bolte ................. B25C 1/047
227/130
3,788,195 A * 1/1974 Lange ................ B25C 1/041
227/130
(Continued)

FOREIGN PATENT DOCUMENTS

DE 40 32 204 A1 4/1992
DE 102 53 670 A1 6/2004
(Continued)

OTHER PUBLICATIONS

International Search Report, PCT/EP2013/076040, dated Mar. 27, 2014.

*Primary Examiner* — Scott A. Smith
(74) *Attorney, Agent, or Firm* — Leydig Voit & Mayer

(57) ABSTRACT

The invention relates to a fastening tool comprising a handheld housing with a piston element (1), which is received in the housing and which can be moved in a driven manner, for transmitting energy to a fixing element (3). The piston element (1) is guided in a cylinder (2) and can be accelerated towards the fixing element (3) by a drive force, and the piston element (1) can be held in a starting position by a magnetic force of a retaining element (5). The retaining element (5) has a first magnetically conductive stop (7) and a second magnetically conductive stop (8). The magnetic stops (7, 8) are connected by a magnetically conductive counter piece (9) arranged on a piston element when the piston element (1) is being held, and excitation magnet (6) is arranged between the magnetically conductive stops (7, 8).

20 Claims, 5 Drawing Sheets

(51) Int. Cl.
*H02K 35/04* (2006.01)
*B25C 1/08* (2006.01)
*H02K 5/24* (2006.01)
*H02K 33/16* (2006.01)
*B25D 11/06* (2006.01)

(52) U.S. Cl.
CPC ............ *B25C 1/04* (2013.01); *B25D 11/064* (2013.01); *H02K 5/24* (2013.01); *H02K 33/16* (2013.01)

(58) Field of Classification Search
CPC ............ H02K 5/24; H02K 7/09; H02K 33/00; H02K 33/16; H02K 35/00; H02K 35/04; B25D 11/064
USPC ......... 227/8, 9, 10, 130, 140, 113, 131, 134, 227/129; 123/46 SC, 46 H, 46 R; 173/117
See application file for complete search history.

(56) References Cited

U.S. PATENT DOCUMENTS

| | | | | |
|---|---|---|---|---|
| 3,878,412 A * | 4/1975 | Kurpanek | ............... | H01H 51/10 173/117 |
| 4,237,987 A * | 12/1980 | Sherman | ............... | B25D 11/064 173/117 |
| 4,353,426 A * | 10/1982 | Ward | ............... | B25D 9/04 173/202 |
| 5,213,247 A | 5/1993 | Gschwend et al. | | |
| 5,497,555 A * | 3/1996 | Averbukh | ............ | B25D 11/064 173/117 |
| 6,520,269 B2 * | 2/2003 | Geiger | ................ | B25D 11/064 173/114 |
| 6,619,527 B1 * | 9/2003 | Moeller | .................... | B25C 1/08 173/210 |
| 6,736,614 B1 * | 5/2004 | Bahnen | ............... | F04B 35/045 417/417 |
| 6,843,401 B2 * | 1/2005 | Favre-Bulle | ............ | B25C 1/08 123/46 SC |
| 6,971,568 B2 * | 12/2005 | Schiestl | ............ | B25C 1/08 227/10 |
| 8,087,394 B2 * | 1/2012 | Adams | .................... | B25C 1/08 123/190.4 |
| 2004/0079302 A1 | 4/2004 | Wolf et al. | | |
| 2004/0104258 A1 | 6/2004 | Favre-Bulle | | |
| 2004/0108353 A1 | 6/2004 | Wolf et al. | | |
| 2007/0240683 A1 | 10/2007 | Zahner et al. | | |

FOREIGN PATENT DOCUMENTS

| | | |
|---|---|---|
| DE | 102 54 965 A1 | 6/2004 |
| JP | 2004-034288 A | 2/2004 |
| JP | 2005-059158 A | 3/2005 |
| JP | 2007-283485 A | 11/2007 |

* cited by examiner

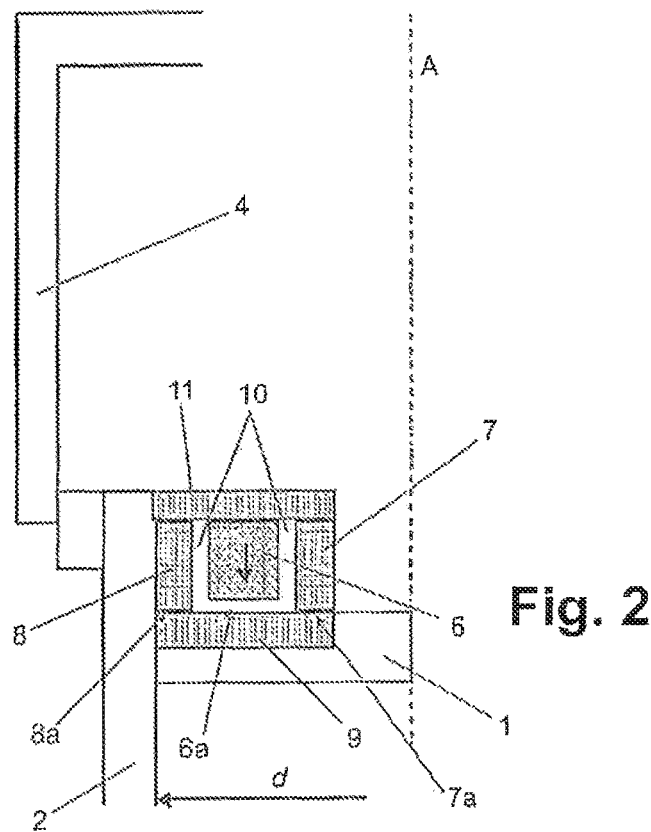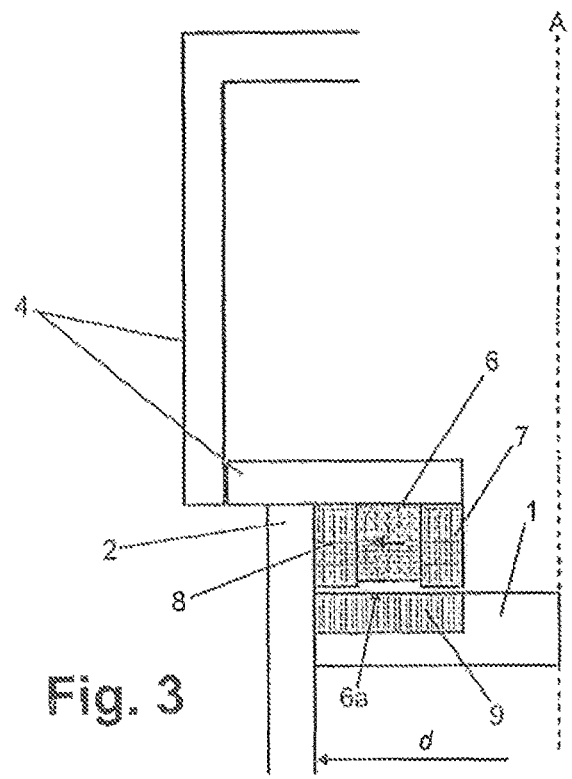

FASTENING TOOL WITH MAGNETIC PISTON HOLDER

CROSS-REFERENCE TO RELATED APPLICATIONS

The application is the U.S. National Stage of International Application Number PCT/EP2013/076040, filed on Dec. 10, 2013, which claims the benefit of German Patent Application Number 10 2012 223 025.4, filed on Dec. 13, 2012, which are each incorporated by reference.

BACKGROUND OF THE INVENTION

The invention relates to a fastener-driving tool according to the preamble of Claim 1.

DE 102 53 670 A1 describes a fastener-driving tool operated with fuel gas, in which a driving piston is held in a starting position by means of a magnet. Thereby a movement of the piston does not start until the combusted fuel gas pressure exceeds the retaining force of the magnet.

BRIEF SUMMARY OF THE INVENTION

The problem addressed by the invention is that of specifying a fastener-driving tool in which a magnetically retained piston is subject to a high retaining force.

This problem is solved for a fastening device of the type mentioned above by the characterizing features of Claim 1. A particularly strong retaining force can be achieved in an easy manner by forming two magnetically conductive stops on a mass of the retaining member. It is particularly preferable if as many magnetic field lines from the excitation magnet as possible pass through the two stops and the contacting mating piece in a closed curve.

In relation to the drive force acting on the piston element, the design of the fastener-driving tool is arbitrary. The invention essentially relates to the magnetic retention of the piston element and in general comprises all fastener-driving tool designs with an accelerated piston element. The tool is preferably a tool driven with fuel gas, in which the drive force is generated by the pressure of the fuel gas ignited in a combustion chamber. The acceleration behavior of the piston is improved if it is released only after the highest possible retaining force exerted by the retaining element has been exceeded. Another preferred embodiment of the fastener-driving tool can be operated with compressed air.

A fastening element within the meaning of the invention is considered to be any drivable nail, bolt or screw.

A magnetically conductive material within the meaning of the invention is understood to mean any material having a high permeability factor $\mu \gg 1$, preferably $\mu > 4$. In particular, a magnetic conductor is understood to mean ferromagnetic substances.

At least the stops and/or the mating piece, as magnetically conductive structures, preferably also consist of a tenacious material, for example iron or an iron alloy, so that contacting or striking by the piston in the retained position does not cause a mechanical destruction or degradation of these structures.

The excitation magnet within the meaning of the invention is understood to mean a structure by which the magnetic retaining force can be provided entirely or at least overwhelmingly. It is especially preferably a permanent magnet having a high magnetic field density. Alternatively or additionally, an electromagnet can be provided as an excitation magnet. By designing the excitation magnet as a permanent magnet, very high retaining forces are possible, particularly with high-quality, modern magnet materials, along with a small installation space and weight of the retaining element. An electromagnet has the advantage that the retaining force can be shut off or modified as necessary.

It is particularly preferred if the mating piece does not directly contact the excitation magnet, in order to prevent mechanical effects on the excitation magnet. Preferably there is only contact with the magnetically conductive stops, wherein an additional contact with elastic damping means can be provided, depending on the detailed design. Preferably only a small distance, via which retaining forces are likewise transmitted and magnetic field lines run, remains between the excitation magnet and the mating piece.

The mating piece is preferably, but not necessarily, formed as a separate component of the piston element. In particular, it can be a ferromagnetic circular ring, which is mounted on a piston made of a different material such as a light metal. Alternatively, the entire piston can also consist of a ferromagnetic material.

For clarification, it should be noted that the magnetically conductive stops and other magnetically conductive structures in the narrow sense, as well as the excitation magnet, consist of ferromagnetic material and can have an unavoidable permanent magnetization, depending on the material. However, the magnetization of the excitation magnet within the meaning of the invention is many times, in particular more than 10 times, the magnetization of the magnetically conductive structures. Consequently, the retaining force within the meaning of the invention is generated overwhelmingly by the field lines exiting from the excitation magnet.

A generally preferred embodiment of the invention provides that the excitation magnet is arranged, at least in certain portions, in a circular ring shape about a central axis of the piston element. Depending on the detailed design, the excitation magnet can be formed as a closed circular ring, or as a plurality of segments arranged in succession in the circumferential direction.

In a preferred refinement, the first stop and the second stop each form, at least in certain portions, a circular ring concentric with the excitation magnet, wherein one of the stops has a smaller radius than the excitation magnet, and the respective other stop has a larger radius than the excitation magnet. Such an arrangement allows optimal exertion of a large retaining force in a relatively narrow peripheral region of the piston element. A narrow peripheral region can be advantageous under certain circumstances, because then the effective surface of the piston on which the gas acts is larger.

A first preferred embodiment provides that the stops adjoin and contact the excitation magnet, wherein an overwhelming portion of the magnetic field lines from the excitation magnet enter radially into the stops. Such an arrangement is especially compact and weight-saving but has relatively high requirements for the production accuracy of the stops and the excitation magnet.

In another, alternative embodiment of the invention, a defined gap is provided between the stops and the excitation magnet, wherein a magnetically conductive coupling element connects the stops and the excitation magnet on a side facing away from the piston. This allows a simple and cost-effective mass production of the retaining element with simultaneously especially high retaining forces. The gap is implemented in particular by a set-back arrangement of the excitation magnet relative to the stops. Alternatively or additionally, the piston element has a surface contour which guarantees a gap between itself and the excitation magnet.

In a generally preferred refinement of the invention, it is provided that the excitation magnet is covered on a side facing the piston by a magnetically conductive foil. It is especially preferred if the foil conductively connects the two stops magnetically. A thickness of the foil is preferably, but not necessarily, less than 0.5 mm. Such a foil can prevent the magnetic flux density in the excitation magnet from taking on critical values, especially at high temperatures, which could lead to a demagnetization of the excitation magnet and reduce its service life. In particular, it is thereby possible to use more cost-effective materials, which have a higher temperature sensitivity, when selecting the excitation magnet.

The design according to the invention of the magnetic retaining element enables particularly high retaining forces for a given overall size and weight of the retaining element. To improve the piston acceleration, it is therefore preferred that a retaining force F of the retaining element is at least F/d=25 N/cm relative to a diameter d of the piston.

Further advantages and features of the invention follow from the embodiments described below as well as from the dependent claims. Several preferred embodiments of the invention will be described below and explained in detail with reference to the attached drawings.

BRIEF DESCRIPTION OF THE SEVERAL VIEWS OF THE DRAWING(S)

FIG. 2 shows a detail view of the magnetic retaining element of the fastener-driving tool from FIG. 1.

FIG. 3 shows a detail deal of a magnetic retaining element according to a second embodiment of the invention.

DETAILED DESCRIPTION OF THE INVENTION

Figure 1:
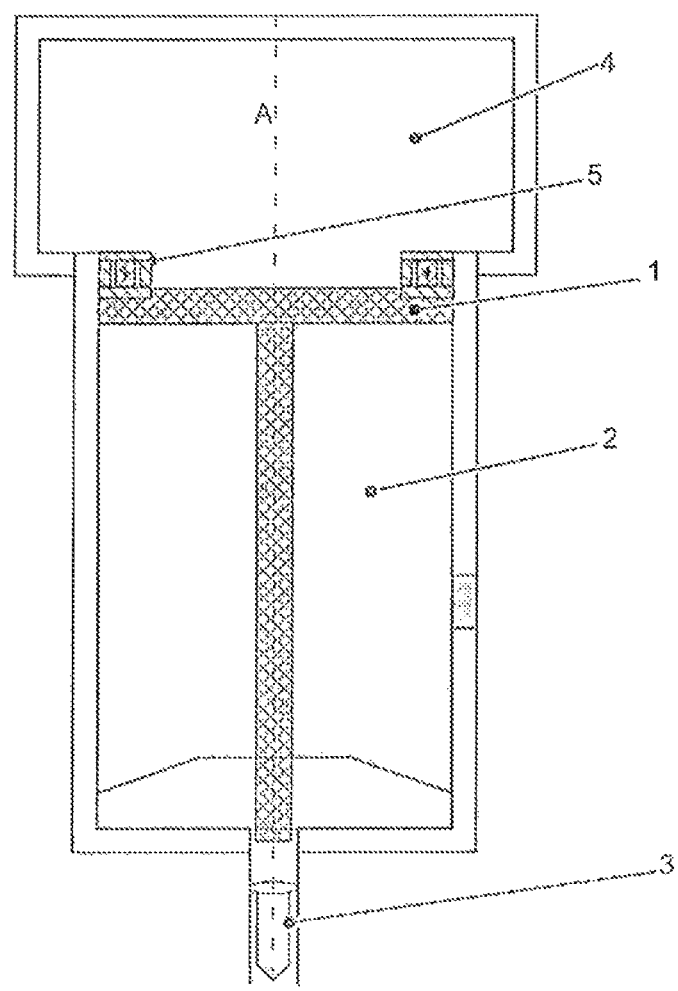
FIG. 1 shows a schematic sectional view of a fastener-driving tool according to the invention according to a first embodiment.

The fastener-driving tool shown in FIG. 1 comprises a piston element 1, which is guided in a cylinder 2 and is drivably movable along an axis A. A drive plunger 1a of the piston element 1 strikes as a result of the piston movement against a fastening element 3, in the form of a nail in the present case, in such a manner that the fastening element 3 is driven into a workpiece (not shown). The components shown are arranged in a known manner in a hand-held housing (not shown), such that the fastening device is formed as a portable tool for mobile use by an operating person.

The piston 1 is driven in the present case by the expansion of an ignited air/fuel gas mixture in a combustion chamber 4 arranged above the cylinder 2. In an initial position shown in FIG. 1, the piston is retained by means of a magnetic retaining element 5. In other embodiments, which are not shown, the piston is driven by compressed air or by the expansion of an ignited fuel powder from a powder cartridge. After ignition of the fuel gas, the pressure in the combustion chamber increases, while the volume is constant, until the pressure force exerted onto the piston exceeds the magnetic retaining force F of the retaining element 5. The initial acceleration of the piston increases proportionately to the magnitude of the previously existing retaining force.

The magnetic retaining element 1 is shown in more detail in FIG. 2. It comprises an annular permanent magnet 6, arranged concentrically to the axis A and functioning as an excitation magnet, the magnetization of which is oriented parallel to the axis A. A first stop 7 and a second stop 8 are each formed as rings, the first stop 7 having a smaller radius than the excitation magnet 6 and the second stop 8 having a larger radius than the excitation magnet 6. The first stop 7 is arranged radially inside the excitation magnet 6 and overlapping it axially. The excitation magnet 6 is in turn arranged radially inside the second stop 8 and axially overlapping it. The first stop 7 is likewise arranged overlapping the second stop 8, preferably at the same axial height.

Annular air gaps 10 remain between the stops 7, 8 and the excitation magnet, such that the excitation magnet is connected to the stops 7, 8 in a non-contacting manner radially.

The stops 7, 8 have annular front sides 7a, 8a, against which a mating piece 9 of the piston element 1 rests. The stops 7, 8 are magnetically connected by the mating piece 9 and therefore a high magnetic retaining force pulls the mating piece 9 against the stops 7, 8.

An air gap 6a, preferably having a width less than 0.4 mm and typically a width of approximately 0.1 mm remains between the excitation magnet 6 and the mating piece 9. Therefore the mating piece 6 does not directly contact the excitation magnet, but at the same time, a sufficient passage of field lines is ensured by the small width of the air gap 6a. The air gap 6a is preferably as small as possible.

The stops 7, 8 are connected to one another via a coupling element 11 on a side facing away from the piston element 1, wherein the excitation magnet is mounted contacting the coupling element 11. The excitation magnet 6 and the coupling element 11 can be connected by gluing, form-fitting connecting means or in some other manner.

The stops 7, 8, the coupling element 11 and the mating piece 9 each consist within the meaning of the invention of magnetically conductive material such as an iron alloy or a sintered ferrite.

Figure 4:
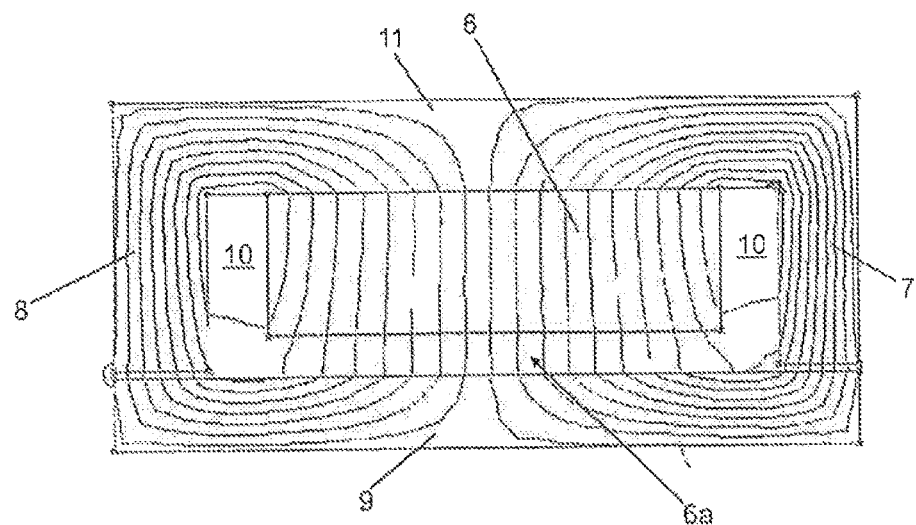
FIG. 4 shows the calculated field line curve of the magnetic retaining element from FIG. 2.

The calculation or simulation of the magnetic field lines in FIG. 4 shows that the field lines are closed in an approximately annular shape in the retained state of the piston element 1, which results in a high retaining force.

In the present example, the piston element 1 has a diameter d of 7 cm. The calculation of the retaining force F shown in FIG. 5 indicates that typical forces can be in the range above 300 N and up to approximately 600 N. In relation to the piston diameter, this corresponds to a force from approximately 43 N/cm to approximately 85 N/cm.

Figure 5:
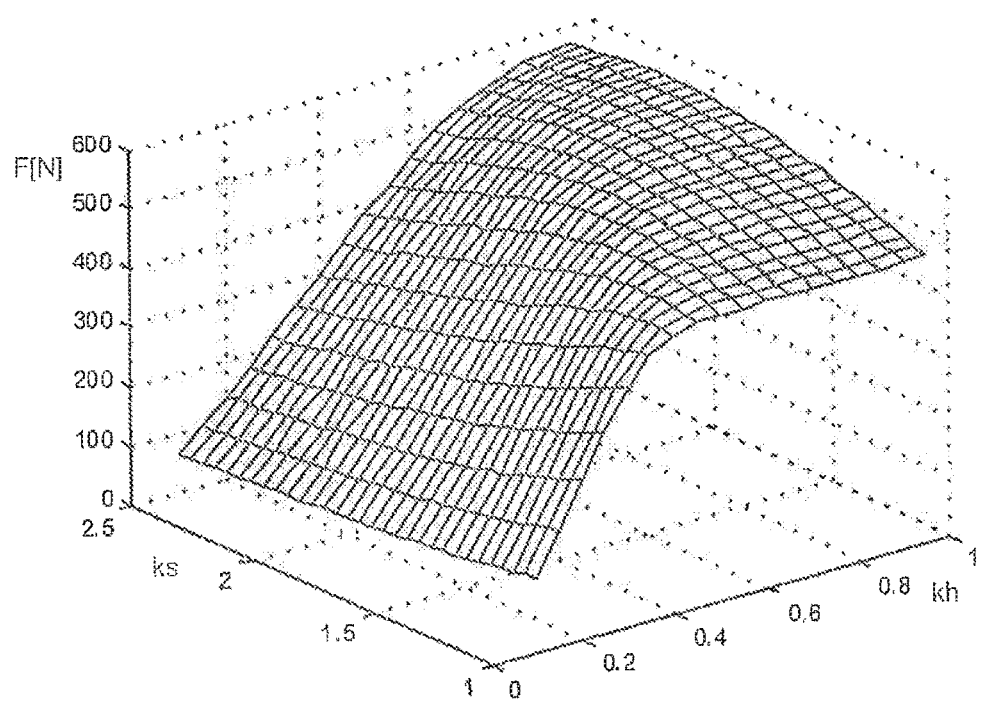
FIG. 5 shows a calculated retaining force of the retaining element from FIG. 2 as a function of two geometric parameters.

In the calculation according to FIG. 5, geometric parameters of the retaining element are varied. The parameter ks is defined as the ratio Am/Af, where Am is the end-face surface area of the excitation magnet 6 and Af is the sum of the surface areas of the front sides of the stops 7a, 8a. The parameter kh is defined as the ratio of a height of the coupling member 11 measured in the axial direction to a height of the mating piece 9 measured in the axial direction.

The weight of the retaining element can be optimized by considering and optimizing these and other geometric parameters. Additional geometric pattern parameters are the width of the air gaps 10, preferably but not necessarily identical, the height and width of the magnet 6 and the height and width of the stops 7, 8.

FIG. 3 shows a second example, different from the first example, of the retaining element according to the invention. In this case, the stops 7, 8 directly contact the excitation magnet (permanent magnet) 6 in the radial direction, so that there are no air gaps remaining The excitation magnet 6, differing from the first embodiment, has a radially directed magnetization, so that the field lines enter straight into the stops 7, 8 in the radial direction.

Differently from the first embodiment, it is possible to forgo a coupling element between the stops, due to the absence of air gaps. This enables a lighter construction with comparable retaining forces. The stops 7, 8 shown in FIG. 3 are connected via a magnetically nonconductive bottom of the combustion chamber 4, which is made from an aluminum alloy.

Figure 6:
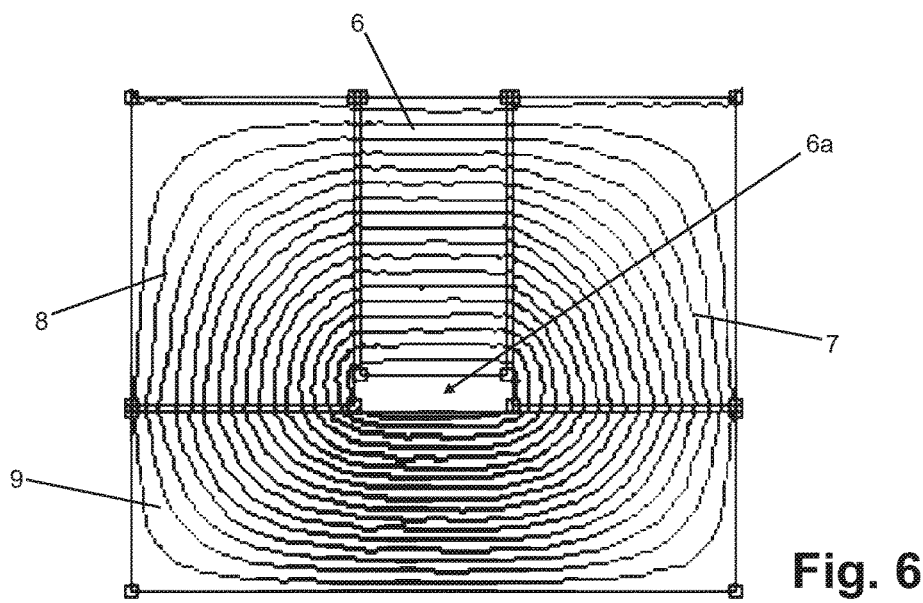
FIG. 6 shows the calculated field line curve of the magnetic retaining element from FIG. 3.
Figure 7:
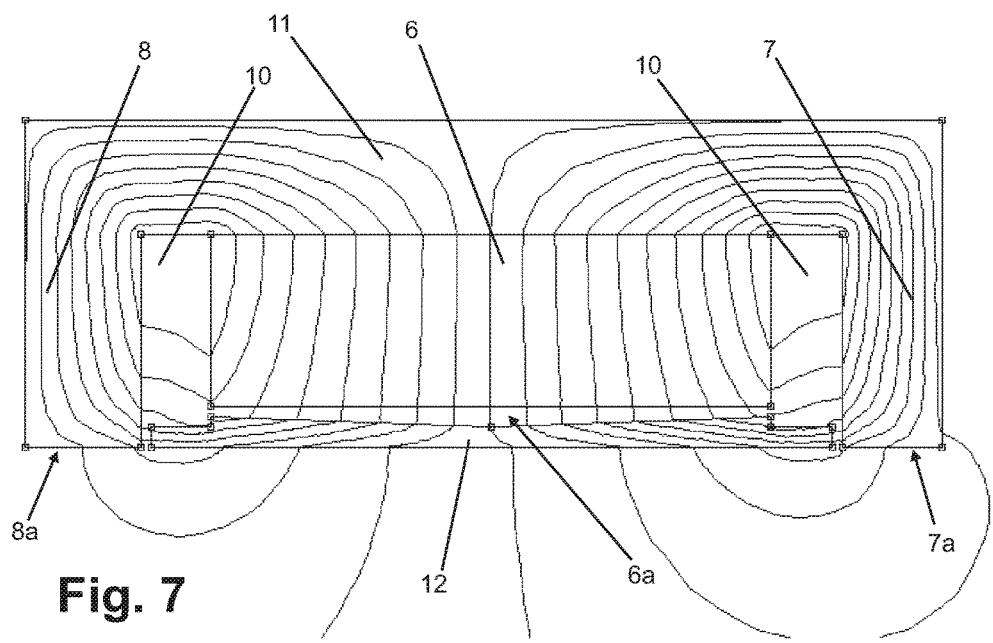
FIG. 7 shows a calculated field line curve of a magnetic retaining element in a third embodiment of the invention, having a magnetically conductive foil.

FIG. 6 shows a calculation of the magnetic field line curve in the retaining element of the second embodiment. It is clear that, differently from the first embodiment, only one set of concentric field lines is present, wherein no field lines exit the axially directed surfaces of the excitation magnet 6 due to the 90°-rotated magnetization. Accordingly, the size of the gap remaining between the excitation magnet and the contacting mating piece is largely insignificant in this example FIG. 7 shows an additional embodiment of the invention with a calculated curve of the field lines. The retaining element is shown without a contacting mating piece.

The example from FIG. 7, wherein a magnetically conductive foil 12 is arranged underneath the excitation magnet 6, is largely identical to the example from FIG. 1. The foil 12 connects the stops 7, 8 in the current case, so that a high field line density enters into the foil from the stops 7, 8.

In the present case, the foil has a thickness or height of approximately 0.1 mm. As is recognizable from FIG. 7, the foil 12 can have structuring, such as regions of different thickness over its entire width in order to optimize the curve of the field lines.

On the whole, the foil 12 leads to an attenuation, albeit small, of the achievable retaining force F. However, the foil can have the effect that the excitation magnets do not undergo any demagnetization due to the changing positions of the piston, even at higher temperatures.

Figure 8:
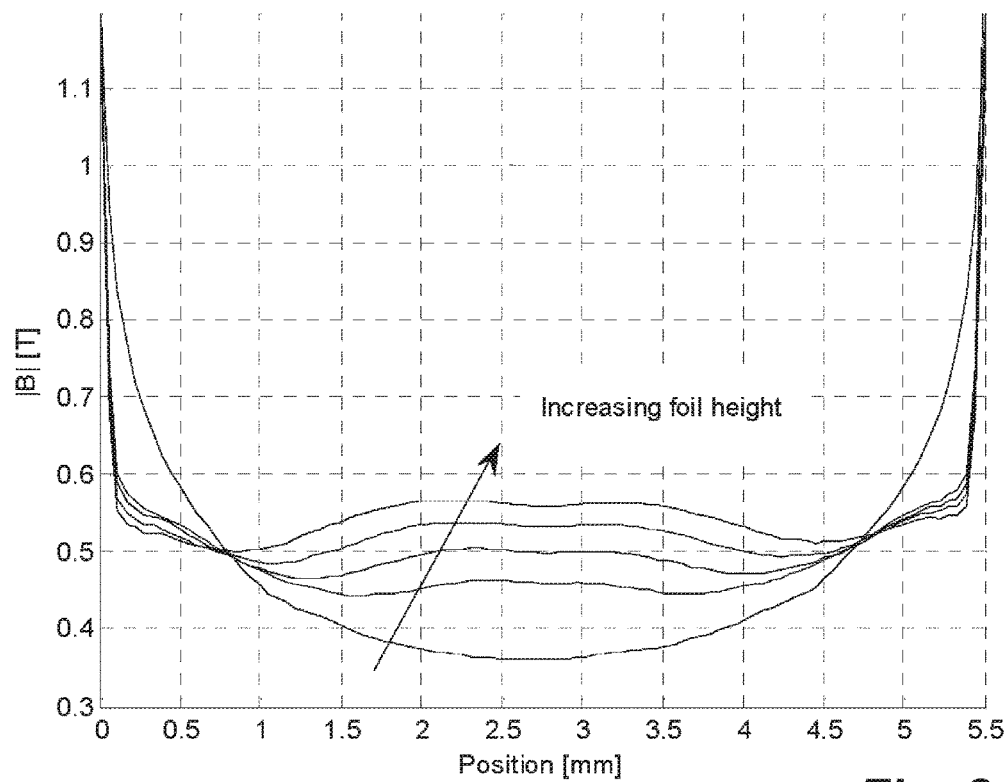
FIG. 8 shows curves of the magnetic field strength of the embodiment from FIG. 7 as a function of the thickness of the foil.

FIG. 8 shows the spatial curve of the magnetic flux density over the lateral extent of the foil shown in FIG. 7 as a function of a thickness of the foil. It is clear that the minimum magnetic flux density increases due to the use of the foil, which can counteract a demagnetization of the excitation magnet at high temperatures, as will become clear below from FIG. 9.

Figure 9:
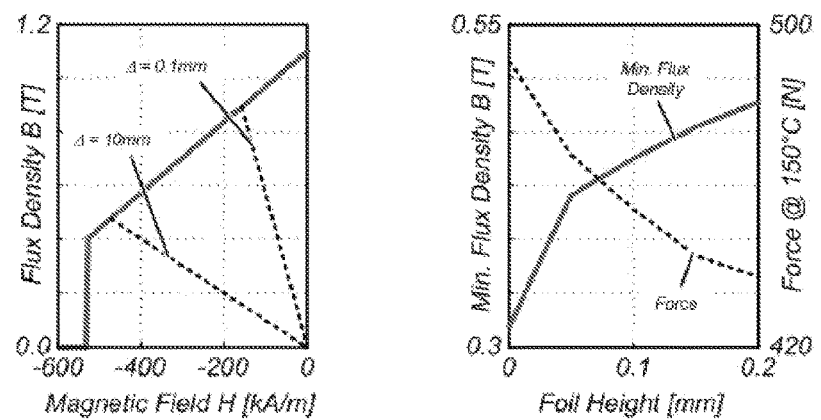
FIG. 9 shows the magnetization behavior of a permanent magnet at the left-hand side, and on the right-hand side, the curve of a retaining force as well as a minimum flux density achievable thereby, as a function of the thickness of the foil.

FIG. 9 shows two diagrams, which relate to a possible demagnetization of the excitation magnet.

The left-hand diagram shows the magnetization behavior of the permanent magnet 6 as a solid line at a given temperature of 150° C. The lower dash line corresponds to a piston distance of Delta=10 mm, which can be equated to a maximally distant piston. The upper dash line corresponds to a piston element 1 in the base position with a contacting mating part (Delta=0.1 mm).

The inflection or sharp decline in the left-hand area of the solid curve corresponds to states of magnetic flux density in which an at least partial demagnetization of the excitation magnet 6 takes place when the piston changes its position. These states are not reached at the given temperature.

The above-described foil 12 can be used to ensure this for the entire range of operating temperatures Alternatively, a material for the permanent magnet that is as suitable as possible could be chosen, which would involve very high expense, however.

The right hand diagram in FIG. 9 shows the curve of the retaining force F (force) as a function of the foil thickness, wherein the achieved minimum flux density is also plotted. It is recognizable that a relatively small decrease of retaining force is accompanied by considerable improvements of the tolerable flux density. In any case, retaining forces of much more than 400 N are achieved for the specific example of a piston diameter d=7 cm.

The foil thickness ("foil height") selected for the left-hand diagram in FIG. 9 is approximately 0.1 mm, so that the minimum flux density is approximately 0.4 T and a retaining force of approximately 470 N is achieved.

The invention claimed is:

1. A fastener driving tool, comprising a hand-held housing, containing a drivably movable piston element for transferring energy to a fastening element, wherein the piston element is guided in a cylinder and can be accelerated against the fastening element by a driving force, wherein the piston element can be held in an initial position by means of a magnetic force from a retaining element, wherein the retaining element has a first magnetically conductive stop and a second magnetically conductive stop, wherein the magnetic stops are connected in a retained state of the piston element by a magnetically conductive mating piece arranged on the piston element, and wherein an excitation magnet is arranged between the magnetically conductive stops.

2. The fastener-driver tool according to claim 1, wherein the excitation magnet is a permanent magnet.

3. The fastener-driver tool according to claim 2, wherein the excitation magnet is arranged circularly about a central axis (A) of the piston element.

4. The fastener-driver tool according to claim 3, wherein the first stop and the second stop each form a circular ring concentric with the excitation magnet, wherein one of the stops has a smaller radius than the excitation magnet, and the respective other stop has a larger radius than the excitation magnet.

5. The fastener-driver tool according to claim 4, wherein the stops adjoin and contact the excitation magnet, wherein part of the magnetic field lines from the excitation magnet enter radially into the stops.

6. The fastener-driver tool according to claim 3, wherein the stops adjoin and contact the excitation magnet, wherein part of the magnetic field lines from the excitation magnet enter radially into the stops.

7. The fastener-driver tool according to claim 2, wherein the stops adjoin and contact the excitation magnet, wherein part of the magnetic field lines from the excitation magnet enter radially into the stops.

8. The fastener-driver tool according to claim 2, wherein a defined gap is provided between the stops and the excitation magnet, wherein a magnetically conductive coupling element connects the stops and the excitation magnet to one another on a side facing away from the piston element.

9. The fastener-driver tool according to claim 1, wherein the excitation magnet is arranged circularly about a central axis (A) of the piston element.

10. The fastener-driver tool according to claim 9, wherein the first stop and the second stop each form, a circular ring concentric with the excitation magnet, wherein one of the stops has a smaller radius than the excitation magnet, and the respective other stop has a larger radius than the excitation magnet.

11. The fastener-driver tool according to claim 10, wherein the stops adjoin and contact the excitation magnet, wherein part of the magnetic field lines from the excitation magnet enter radially into the stops.

12. The fastener-driver tool according to claim 10, wherein a defined gap is provided between the stops and the excitation magnet, wherein a magnetically conductive coupling element connects the stops and the excitation magnet to one another on a side facing away from the piston element.

13. The fastener-driver tool according to claim 9, wherein the stops adjoin and contact the excitation magnet, wherein part of the magnetic field lines from the excitation magnet enter radially into the stops.

14. The fastener-driver tool according to claim 9, wherein a defined gap is provided between the stops and the excitation magnet, wherein a magnetically conductive coupling element connects the stops and the excitation magnet to one another on a side facing away from the piston element.

15. The fastener-driver tool according to claim 1, wherein the stops adjoin and contact the excitation magnet, wherein part of the magnetic field lines from the excitation magnet enter radially into the stops.

16. The fastener-driver tool according to claim 1, wherein a defined gap is provided between the stops and the excitation magnet, wherein a magnetically conductive coupling element connects the stops and the excitation magnet to one another on a side facing away from the piston element.

17. The fastener-driver tool according claim 1, wherein the excitation magnet is covered on a side facing the piston element by a magnetically conductive foil.

18. The fastener-driver tool according to claim 17, wherein the foil magnetically conductively connects the two stops.

19. The fastener-driver tool according to claim 17, wherein the foil is underneath the excitation magnet, and has a thickness of less than 0.5 mm.

20. The fastener-driver tool according to claim 1, wherein a retaining force F of the retaining element is at least $F/d=25$ N/cm relative to a diameter d of the piston element.

* * * * *